(12) United States Patent
Parnas et al.

(10) Patent No.: US 8,461,376 B2
(45) Date of Patent: *Jun. 11, 2013

(54) SYSTEMS FOR ALKYL ESTER PRODUCTION

(75) Inventors: Richard Parnas, West Hartford, CT (US); Clifford Weed, Killingworth, CT (US); Nicholas Leadbeater, Southington, CT (US); Matthew Boucher, Cromwell, CT (US)

(73) Assignee: The University of Connecticut, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,884

(22) Filed: Feb. 15, 2012

(65) Prior Publication Data

US 2012/0142952 A1  Jun. 7, 2012

Related U.S. Application Data

(62) Division of application No. 12/431,033, filed on Apr. 28, 2009, now Pat. No. 8,119,832, which is a division of application No. 11/857,641, filed on Sep. 19, 2007, now Pat. No. 7,544,830.

(60) Provisional application No. 60/884,273, filed on Jan. 10, 2007.

(51) Int. Cl.
*C07C 67/02* (2006.01)

(52) U.S. Cl.
USPC .......................................................... 560/234

(58) Field of Classification Search
None
See application file for complete search history.

(56) References Cited

U.S. PATENT DOCUMENTS

| 5,354,878 | A | 10/1994 | Connemann et al. |
| 5,424,467 | A | 6/1995 | Bam et al. |
| 7,321,052 | B2 * | 1/2008 | Miller et al. ................. 560/231 |
| 7,816,570 | B2 | 10/2010 | Roberts, IV et al. |
| 2003/0032826 | A1 | 2/2003 | Hanna |
| 2003/0224006 | A1 | 12/2003 | Zaworotko et al. |
| 2004/0229062 | A1 | 11/2004 | Rubeck |

(Continued)

FOREIGN PATENT DOCUMENTS

| AT | 405938 B | 12/1999 |
| DE | 20113126 U1 | 11/2001 |

(Continued)

OTHER PUBLICATIONS

European Patent No. 0131991 (A1); Publication Date: Jan. 23, 1985; Abstract Only; 1 Page.

(Continued)

*Primary Examiner* — Karl J Puttlitz
(74) *Attorney, Agent, or Firm* — Cantor Colburn LLP

(57) ABSTRACT

In one embodiment, a method for the production of alkyl esters comprises: introducing liquid biomass and an alcohol to a first transesterification reactor at a point in a lower 25% of the reactor; reacting the liquid biomass and the alcohol to form a liquid glycerol and a liquid alkyl ester, wherein greater than or equal to about 75 mass % of the liquid glycerol moves towards a bottom of the first transesterification reactor; removing a liquid alkyl ester stream from the first transesterification reactor; and removing the liquid glycerol from the first transesterification reactor. The liquid biomass and the alcohol form a combined liquid stream that flows through the first transesterification reactor in a laminar flow.

13 Claims, 2 Drawing Sheets

U.S. PATENT DOCUMENTS

| 2005/0081435 | A1 | 4/2005 | Lastella |
| 2005/0204612 | A1 | 9/2005 | Connemann et al. |
| 2006/0021277 | A1 | 2/2006 | Petersen et al. |
| 2006/0074256 | A1 | 4/2006 | Alasti |
| 2009/0165366 | A1* | 7/2009 | Jovanovic et al. ............ 44/308 |
| 2011/0105813 | A1 | 5/2011 | Roberts, IV et al. |

FOREIGN PATENT DOCUMENTS

| DE | 10135297 | A1 | 2/2003 |
| DE | 10139422 | A1 | 2/2003 |
| EP | 0131991 | A1 | 1/1985 |
| WO | 03015913 | A1 | 2/2003 |
| WO | 2008052308 | A1 | 5/2008 |

OTHER PUBLICATIONS

International Publication No. 03015913 (A1); Publication Date: Feb. 27, 2003; Abstract Only; 2 Pages.

German Patent No. 10135297 (A1); Publication Date: Feb. 6, 2003; Abstract Only; 2 Pages.

German Patent No. 10138822 (A1); Publication Date: Mar. 6, 2003; Abstract Only; 1 Page; Equivalent to German Patent No. 20113126 (U1).

German Patent No. 10139422 (A1); Publication Date: Feb. 27, 2003; Abstract Only; 1 Pages.

Austrian Patent No. 405938 (B); Publication Date: May 15, 1999; Abstract Only; 1 Page.

Bournay et al.; "New Heterogeneous Process for Biodiesel Production: A Way to Improve the Quality and the Value of the Crude Glycerin Produced by Biodiesel Plants"; Catalysis Today; vol. 106; 2005; pp. 190-192.

He et al.; "Experimental Optimization of a Continuous-Flow Reactive Distillation Reactor for Biodiesel Production"; American Society of Agricultural Engineers; vol. 48, vol. 6; 2005; pp. 2237-2243.

He et al.; "Function and Performance of a Pre-Reactor to a Reactive Distillation Column for Biodiesel Production"; American Society of Agricultural and Biological Engineers; vol. 50, Issue 1; 2007; pp. 123-128.

He et al.; "A Novel Continuous-Flow Reactor Using Reactive Distillation for Biodiesel Production"; American Society of Agricultural and Biological Engineers; vol. 49, Issue 1; 2006; pp. 107-112.

Komers et al.; "Kinetics and Mechanism of the KOH—Catalyzed Methanolysis of Rapeseed Oil for Biodiesel Production"; Eur. J. Lipid Sci. Technol.; vol. 104; 2002; pp. 728-737.

McMillen et al.; "Biodiesel: Fuel for Thought, Fuel for Connecticut's Future"; Connecticut Center for Economic Analysis, University of Connecticut; Mar. 24, 2005; 57 Pages.

Nie et al.; "Lipase Catalyzed Methanolysis to Produce Biodiesel: Optimization of the Biodiesel Production"; Journal of Molecular Catalysis B: Enzymatic; vol. 43; 2006; pp. 142-147.

Parnas et al.; "Isothermal Reactor Design"; Elements of Chemical Reaction Engineering; 4th Edition; Chapter 4; 2005; pp. 143-252.

International Search Report; International Application No. PCT/US2008/000327; International Filing Date: Jan. 9, 2008; Date of Mailing: Jun. 16, 2008; 6 Pages.

Written Opinion of the International Searching Authority; International Application No. PCT/US2008/000327; International Filing Date: Jan. 9, 2008; Date of Mailing: Jun. 16, 2008; 7 Pages.

Tashtoush et al.; "Experimental Study on Evaluation and Optimization of Conversion of Waste Animal Fat into Biodiesel"; Energy Conversion and Management; vol. 45; 2004; pp. 2697-2711.

Walas; "Chemical Reactors"; Perry's Chemical Engineer's Handbook; 7th Edition; 1997; Section 23; pp. 1-61.

Wang et al.; "Comparison of Two Different Processes to Synthesize Biodiesel by Waste Cooking Oil"; Journal of Molecular Catalysis A: Chemical; vol. 252; 2006; pp. 107-112.

* cited by examiner

SYSTEMS FOR ALKYL ESTER PRODUCTION

CROSS REFERENCE TO RELATED APPLICATIONS

This application is a divisional application of U.S. patent application Ser. No. 12/431,033, filed Apr. 28, 2009, which is a divisional application of U.S. patent application Ser. No. 11/857,641 filed Sep. 19, 2007, which claims the benefit of the filing date of U.S. Provisional Application Ser. No. 60/884,273 filed Jan. 10, 2007; the entire contents of which are hereby incorporated by reference.

TECHNICAL FIELD

This application relates to alkyl ester production, and especially relates to the continuous reaction/separation in the production of alkyl ester.

BACKGROUND

One potential solution to mitigate environmental and macroeconomic displacements is the use of energy derived from locally produced biomass. Two particular such bio-fuels are ethanol and biodiesel. While ethanol has garnered more attention due to a longer track record and the activities in Brazil, biodiesel is actually a higher energy fuel with greater environmental benefits. Typically biodiesel is produced by transesterification of triglycerides with methanol.

Most of the production of biodiesel fuel is carried out in batch reactors, where measured quantities of the triglycerides, methanol, and catalyst are added to a tank, heated, and mixed for a period of time ranging from 1 hour to several hours. After a period of time, the reacted mixture is pumped to another vessel and allowed to sit, quiescent for a second period of time. The mixture then phase separates into a biodiesel layer and a glycerol layer, and the glycerol layer is drained. The resulting biodiesel is then further purified.

In some currently used processes, continuous centrifuge technology is used to separate glycerol, and carry out the water washing steps to remove residual alcohol from the biodiesel product. Also, current patent applications include flash separation of methanol from the biodiesel as an alternative method to the water-washing step. Some current processes apply distillation methods to separate the biodiesel from the glycerol byproduct based on their volatility differences. In one current process, biodiesel separation from glycerol is claimed to occur in a reactor where the feed is introduced at the top and an impure biodiesel stream and an impure glycerol stream are both withdrawn near the bottom.

In prior art process, both desired product biodiesel and byproduct glycerol are withdrawn near the bottom of the reactor as liquid streams. The proximity of the withdrawal points for these two product streams implies there will be significant mixing and cross-contamination. This assertion is born out by the presence of many downstream separators and complicated processing required to further purify the products. In this process, the concentration of both products, biodiesel and glycerol, increases towards the bottom of the reactor, thereby hindering the conversion process.

The processes based on reactive distillation produce high purity glycerol and high purity biodiesel with small amounts of residual methanol. However, these processes are energy intensive due to the necessity of providing large quantities of heat to boil the bottoms product and produce the vapor stream for the distillation column. Distillation processes separate materials having different volatility by successively vaporizing higher and higher purity streams of the more volatile material and successively condensing higher and higher purity streams of the less volatile material. This process depends on the equilibrium between vapors and liquids, and is driven by the heat input necessary to boil the material.

Although these processes successfully produce biodiesel fuel, more efficient, economical processes are continuously sought.

BRIEF DESCRIPTION

This disclosure is directed to methods and systems for processing alkyl esters.

In one embodiment, the method comprises: combining liquid biomass with an alcohol to form a combined liquid stream, introducing the combined liquid stream to a first transesterification reactor between a liquid glycerol outlet and a liquid alkyl ester outlet, reacting the liquid biomass and the alcohol to form liquid glycerol and liquid alkyl ester, and removing a liquid alkyl ester stream from an upper portion of the first transesterification reactor. The combined liquid stream flows upward through the reactor at a rate that is less than a settling velocity of the liquid glycerol.

In another embodiment the method comprises: combining liquid biomass with an alcohol to form a combined liquid stream, introducing the combined liquid stream to a first transesterification reactor at a point in a lower 25% of the reactor, between a liquid glycerol outlet and a liquid alkyl ester outlet, reacting the liquid biomass and the alcohol to form liquid glycerol and liquid alkyl ester, removing the liquid alkyl ester stream from the first transesterification reactor, removing the liquid glycerol from the first transesterification reactor, and purifying the liquid alkyl ester stream. The combined liquid stream has a laminar flow. Greater than or equal to about 75 mass % of the liquid glycerol settles towards a bottom of the first transesterification reactor In one embodiment, an alkyl ester production system can comprise: a first transesterification reactor comprising a liquid biomass inlet located between a liquid glycerol outlet and a liquid alkyl ester outlet, a water wash vessel comprising an alkyl ester inlet, a water inlet located near a top of the water wash vessel, and a washed alkyl ester outlet located near the top of the water wash vessel, wherein the alkyl ester inlet is located near a bottom of the water wash vessel, and a drier comprising a washed alkyl ester inlet located near a top of the drier, a gas inlet located near a bottom of the drier, and a dried alkyl ester outlet located near the bottom of the drier. The liquid biomass inlet can be in fluid communication with a liquid biomass source and a liquid alcohol source. The first transesterification reactor can be configured for laminar flow and for liquid reactants and products. The alkyl ester inlet can be in fluid communication with the washed alkyl ester outlet.

The above described and other features are exemplified by the following figures and detailed description.

BRIEF DESCRIPTION OF THE DRAWING

Referring to the figures, which are merely exemplary, not limiting, and wherein like numbers are numbered alike.

DETAILED DESCRIPTION

Figure 1:
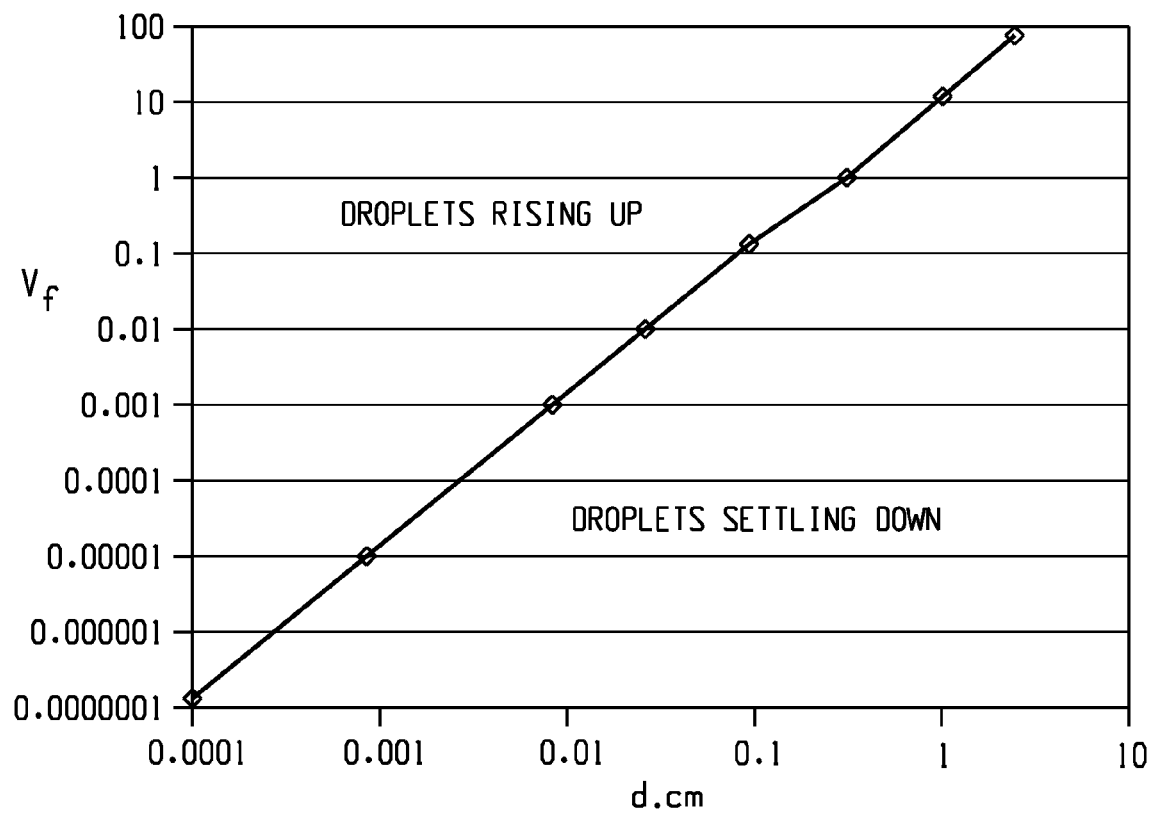
FIG. 1 is a graphical illustration of the upward flow speed of the lower density oil phase versus diameter of equivalent sphere of high density phase.

Disclosed herein is a continuous method of producing biodiesel fuel that simultaneously creates the biodiesel product and separates it from byproduct glycerol. The method achieves separation of reaction products biodiesel and glycerol by buoyancy driven phase separation; the biodiesel flowing upward and the glycerol settling downward. As the reacting stream flows upward, the biodiesel and glycerol are created, they phase separate due to immiscibility, and the heavier glycerol settles if the upward flow speed is less than the settling velocity of the glycerol. The reaction and separation occur in one single vessel, and the reaction and separation occur continuously so that the separated biodiesel and glycerol products continue to emerge from the vessel as long as reactants are fed into the vessel.

The current method constitutes a lower energy consumption process than the reactive distillation process discussed above. Advantageously, the buoyancy driven separation of the present method can be used for all the separation steps, including the washing and moisture removal steps. The reactor/separator for the current process is designed and operated differently than in the reactive distillation process. First, the current process contains only liquid streams, whereas the reactive distillation system contains both liquid and vapor streams. The current process does not require the high energy inputs necessary to generate vapor streams and the reactor/separator does not need the stages and packings associated with the turbulent multi-phase flows used in reactive distillation processes.

Multiple vessels can be concatenated to form a continuous system to achieve conversion of reactants (e.g., complete conversion (i.e., greater than or equal to 99.5 mass percent (mass %) conversion)), separation of glycerol (e.g., nearly complete separation (i.e., removal of greater than or equal to 98 mass % of the glycerol from the biodiesel product)), biodiesel washing to remove residual alcohol, glycerol, and catalyst, and moisture removal from the biodiesel product stream. The units for achieving reaction, separation, washing, and drying can be arranged in a number of configurations including recycle, parallel processing, and hybrid serial/parallel processing to achieve optimal results for a wide variety of feed stocks. This type of reactor/separator can be applied to any chemical system where the reaction products separate into phases of different densities, and especially in the case of reversible reactions.

In the present process, the reacting mixture flows upwards and the glycerol settles downwards. This is significantly different in design and operation than processes where both the biodiesel and glycerol streams are removed from the bottom of the reactor. In the present process, there is little or no cross contamination of the two product streams, biodiesel and glycerol, and they are collected and withdrawn from the reactor at widely separated locations. Hence, subsequent purification is much easier and economical. Furthermore, removing glycerol as the reaction proceeds enhances conversion in the transesterification process. In the present process there is a glycerol concentration gradient in the reacting stream because the glycerol settles downwards, leaving very little glycerol in the upper portion of the reactor. Consequently, conversion is enhanced in the upper portion of the reactor.

The glycerol settles down through the biodiesel and oil mixture with a velocity that depends upon the droplet size of the glycerol. For example, the settling velocity of 5 mm diameter glycerol droplets in biodiesel can be roughly 3 centimeters per second (cm/s). Smaller droplets settle at lower velocities while larger droplets settle at higher velocities. Moreover, as the reaction proceeds and creates glycerol, the molecules of glycerol created aggregate and form droplets that grow, e.g., by coarsening mechanisms. These coarsening glycerol droplets settle out of the reacting mixture, even as the reacting mixture flows upwards, as long as the upward fluid velocity is less than the settling velocity for easily attained glycerol droplet sizes. This continuous flow and settling mechanism also works better if the flow is smooth and laminar, rather than turbulent and mixed. Laminar flow is defined as flow where fluid follows via smooth pathways, does not eddy, and has a Reynold's number, Re, less than or equal to 2,100. Once the glycerol produced in the reaction grows to droplets of a size of more than a few micrometers (μm), they settle downwards if the upward flow speed of the oil phase (biomass) is not too large.

Equation I provides a design basis for the reactor.

$$v_s = v_f - \frac{(\rho_h - \rho_l)gd^2}{18\mu} \quad \text{Equation I}$$

where:
$v_s$=settling speed of the high density glycerol phase (centimeters per second (cm/s)),
$v_f$=upward flow speed of the lower density oil phase (cm/s),
$\rho_h$=density of higher density phase (grams per cubic centimeter (g/cc)),
$\rho_l$=density of lower density phase (g/cc),
g=gravitational acceleration (cm/s$^2$),
d=diameter of equivalent sphere of high density phase (cm), and
μ=viscosity of lower density phase (g/cm/s).

If $v_s$=0, then $v_f$ can be plotted against the droplet size d. FIG. 1 illustrates the equation for the particular case of glycerol settling through biodiesel fluid. If the fluid rise velocity, $v_f$, is set, FIG. 1 indicates the droplet size above which settling will occur. This approach is applicable for strongly separating phases like glycerol and methyl ester biodiesel, where the droplets grow to sizes larger than 0.1 cm within a few seconds. Thus, fluid rise velocities up to a few millimeters per second (mm/s) are permissible. This technique can also be used for weakly phase separated mixtures, such as glycerol in ethyl ester biodiesel. In such cases, experimental techniques such as light scattering can be used to ascertain the droplet sizes attained in a reasonable time, and then the acceptable fluid rise velocity can be determined off the graph.

For the biodiesel production, the reactor/separator(s) can be placed in a series, one after the other. In between each vessel, a mixture and reactant addition port can be placed to allow for a stage wise reaction/separation process that can be optimized to maximize biodiesel production and separation efficiencies at the same time. Thus, high conversion efficiencies can be readily attained without the addition of excess alcohol in the first stage to force the high conversion. As a result, high levels of alcohol contamination of the glycerol byproduct are avoided, and minimal alcohol in the biodiesel product is attained. This enables economical production; minimizing alcohol loss, alcohol reclamation costs, and biodiesel cleanup costs. For example, the reactors can use less than or equal to 10% over the stoichiometric amount of methanol for the conversion to biodiesel (i.e., balanced stoichiometry for the transesterification reaction to produce the biodiesel), with substantially below 10% believed possible (e.g., less than or equal to 5% over the stoichiometric amount).

The continuous separation during flow can also be applied to the wash step(s) (e.g., water wash step(s)) and the drying step(s) (e.g., air-drying step(s)). Since the amount of alcohol introduced to the transesterification reactor(s) is a substantially stoichiometric amount, no additional reaction is intended to occur in the wash and air-drying steps (i.e., any reactions are residual reactions from the remaining reactants and are not induced by the addition of new reactants). It is noted that any reaction that does occur is a result of residual reactants from the transesterification reactions and not from the addition of reactants to the water wash vessel or drier. In other words, no alcohol or reacting stream are introduced to the wash steps and the drying steps. In the water wash case, water can be added at the top of the flow vessel by a distribution medium. The water then settles through the biodiesel product at a settling velocity also determined by droplet size, and is collected at the bottom of the vessel. The collected water contains excess alcohol and catalyst. In the air-drying step, air dispersed into the flowing biodiesel rises to the top of the vessel more quickly than the biodiesel due to buoyancy. The residual water is removed with the air from the biodiesel.

The entire integrated process can be a staged set of flow vessels that produce biodiesel continuously. The process is scalable since a wide range of production rates can be achieved by simply selecting the appropriate flow vessel diameter, noting that the flow increases as the square of the diameter if the flow velocity is held constant.

The present process can be employed to produce lower alkyl esters (e.g., $C_1$ to $C_4$) from a biomass source such as triglycerides (e.g., higher fatty acid triglycerides ($C_6$-$C_{24}$ or so)), natural oil(s) and/or natural fat(s) comprising free fatty acids, and combinations comprising at least one of the foregoing biomass. Possible biomass sources include oils (e.g., vegetable oil, sunflower seed oil, soya bean oil, corn oil, cottonseed oil, almond oil, groundnut oil, palm oil, coconut oil, linseed oil, castor oil, rapeseed oil, industry tallow, abattoir waste, including used oils (such as used (e.g., waste) cooking oils from restaurants), and the like), and combinations comprising at least one of the foregoing biomass.

The biomass source is combined with alcohol and optionally with a catalyst (e.g., with a catalyzed alcohol), to form the reacting stream. Generally, the alcohol can be a $C_1$-$C_4$ alcohol(s), such as methanol, ethanol, isopropanol, butanol, multivalent alcohol(s) (such as trimethylolpropane), as well as combinations comprising at least one of the foregoing alcohols. The alcohol can optionally be combined with a transesterification catalyst, e.g., an alkaline catalyst, acid catalyst, and so forth. Possible transesterification catalysts include: metal alcoholoates, metal hydrides, metal carbonates, metal acetates, sodium alkoxide, sodium hydroxide, potassium hydroxide.

Figure 2:
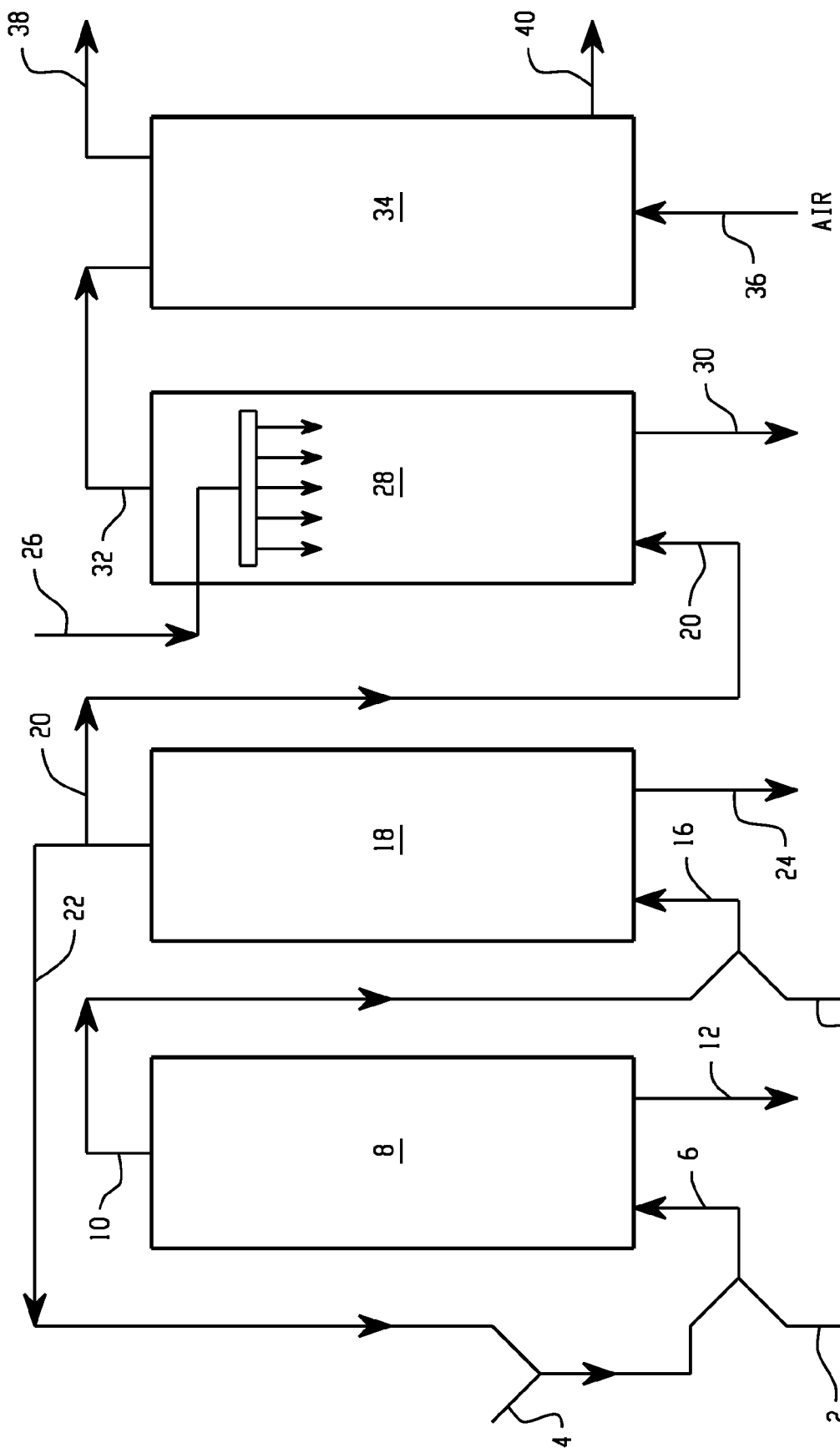
FIG. 2 is a schematic representation of one embodiment of a biodiesel production system.

Referring to FIG. 2, an exemplary embodiment of a biodiesel system is illustrated. In this system, the alcohol stream 2 (that is optionally catalyzed) can be combined with the biomass stream 4 using, for example, a static mixer to form a combined stream 6 (e.g., the reacting stream). Although the process can proceed at room temperature, optionally, the biomass stream 4 and/or the combined stream 6 can be heated, e.g., to a temperature of less than or equal to about 65° C. The combined stream 6 can then be introduced to the transesterification reactor 8. The combined stream 6 is introduced to the transesterification reactor 8 between the outlet for the initial biodiesel stream (e.g., the liquid alkyl ester stream) 10 and the outlet for the glycerol stream 12. For example, the combined stream 6 can be introduced to a bottom portion of the transesterification reactor 8, above where a glycerol stream 12 will be removed from the reactor 8. For example, the combined stream can be introduced within the bottom 75% of the reactor so as to flow upwards. In order to attain sufficient residence time and hence biodiesel production, introduction is generally at or below the mid-point of the reactor, or, more specifically, within the lower 25% of the reactor, and above the glycerol removal point. In order to attain the desired separation of the biodiesel, glycerol, and reactants (catalyst, alcohol, and biomass), the flow through reactor 8 is preferably laminar and at a controlled velocity that enables the glycerol to fall to the bottom of the reactor as remaining reactants and biodiesel flow to the top of the reactor.

Once the system is at steady state, as the combined stream 6 flows into transesterification reactor 8, an initial biodiesel stream 10 can be removed from at or near the top of the reactor 8 (e.g., within 10% distance from the top of the reactor), while glycerol stream 12 can be removed from the reactor at a point below where the combined stream 6 enters the transesterification reactor 8 (e.g., at the bottom of the reactor). Since the glycerol stream 12 is removed from the reactor at a point below the introduction point of the combined stream, as the reaction proceeds the reaction equilibrium shifts, driving the reaction to additional conversion to biodiesel and glycerol.

To further enhance the conversion efficiency, the initial biodiesel stream 10 can optionally be combined with an additional catalyzed alcohol stream 14, e.g., via a static mixer, such that a combined stream 16 can be introduced into another transesterification reactor(s) 18, e.g., in the same fashion as introduced to the first transesterification reactor 8 (at a point above where glycerol will be removed from the reactor 18). With the combination of the two transesterification reactors, a virtually 100% conversion efficiency can be attained. As with the transesterification reactor 8, the flow through the transesterification reactor 18 is controlled to allow the settling of the glycerol and the removal of biodiesel and remaining reactants from at or near the top of the reactor 18. Optionally, a portion of the biodiesel stream exiting the transesterification reactor 18 can be recycled in recycle stream 22 to transesterification reactor 8 and/or transesterification reactor 18, while glycerol can be removed from transesterification reactor 18 in glycerol stream 24. The remainder of the biodiesel product stream 20 can optionally be further processed, e.g., passed through additional transesterification reactor(s), washed, and/or dried.

The washing step can be performed in a water wash vessel 28 where the biodiesel product stream 20 enters the bottom of water wash vessel 28, while water is introduced near the top. As the water is disbursed through the biodiesel, it removes excess alcohol and catalyst therefrom to produce a water wash that exits the bottom of the vessel 28 as water wash stream 30. Within this vessel, catalyst and alcohol migrate to the water droplets out of the biodiesel stream. The washed biodiesel stream 32 exiting vessel 28 can then be introduced to the top of a drier 34. Air 36 introduced to the bottom of the drier 34 passes through the washed biodiesel in a countercurrent fashion to remove residual water therefrom. The air stream 38 can then be removed from the top of the drier 34, while the dried biodiesel 40 can be removed from the bottom. It is understood that the various streams can be processed and recycled in various fashions to enhance efficiency and viability of the process. For example, water can be condensed from the air stream 38 to form a dry air stream and a water stream that can be used in the drier 34 and water wash vessel 28, respectively. Furthermore, the alcohol can be recovered (e.g., using a flash reactor) and recycled.

For example, a system comprising 1 reactor, 1 wash, and 1 drier, when operated properly (i.e., in accordance with the present disclosure) will produce ASTM quality biodiesel. ASTM quality biodiesel requires greater than 99 mass % conversion and greater than 99.8 mass % glycerol removal. Although some other systems may claim ASTM quality processing, the National Biodiesel Board estimates that, in 2006, more than half of all biodiesel produced in the USA was not ASTM grade.

The following examples are merely exemplary and are intended to further explain and not to limit the process and system disclosed herein.

EXAMPLES

The basic process configuration with a single reactor/separator was realized for Examples 1 and 2 in a separatory funnel, where the valved outlet at the bottom of the funnel was used to draw off the glycerol as it settled out of the reacting mixture. The prototype reactor, a separatory funnel, was fitted with a 2-hole stopper at the top to support the tubes for reactant introduction and biodiesel product stream removal. The tube introducing the stream of premixed reactants was inserted such that the reactant stream entered the reactor towards the bottom of the reactor. The tube providing an exit for the biodiesel product stream was inserted such that the biodiesel product stream was withdrawn from the top of the reactor.

Although the reactor could be run using vegetable oil combined with any of several alcohols and catalysts, in these experiments (Examples 1-3) the oil used was soy oil. It was mixed with a stream of methanol already containing dissolved potassium hydroxide.

Example 1

1:6 volumetric ratio of methoxide (1.5% (w/w)(potassium hydroxide to oil) in methanol) to oil was continuously fed to the reactor for 45 minutes at a flow of 1.1 milliliters per second (ml/s). During this time 400 milliliters (ml) of glycerol was collected from the bottom of the reactor and 1,600 ml of biodiesel product was collected from the top of the reactor. These products were analyzed by gas chromatography and nuclear magnetic resonance. The results showed that during the 15 minute residence time in the reactor/separator, 89 mass percent (mass %) of the vegetable oil was converted to biodiesel (all that was possible due to a limiting amount of methoxide).

Example 2

In the second experiment, a 1:2 volumetric ratio of methoxide to oil was continuously fed to the reactor for 40 minutes at a flow of 2.5 ml/s. During the 6.7 minute residence time, 95.5 mass % of the vegetable oil was converted to biodiesel.

Example 3

A larger prototype reactor was constructed to validate the design concept at a scale similar to commercial production. The reactor that was 4 feet (1.2 meters (m)) long and 6 inches (0.15 m) in diameter was run for a period of 16 hours. During this time period, 230 gallons (871 liters (l)) of waste vegetable oil was converted to 230 gallons (871 l) of ASTM quality biodiesel fuel. The process comprised heating the oil to 120° F. (48.9° C.) and mixing it with room temperature methoxide prior to injection into the reactor at a 1:3 to 1:4 volumetric ratio of methoxide to oil at a flow rate of 18.9 liters per hour (l/h) (5 gallons per hour (gal/h)) of 75.7 l/h (20 gal/h).

The chemical conversion of the vegetable oil was checked several times during the 16 hour period by both gas chromatography and nuclear magnetic resonance, and conversion in excess of 99 mass % was maintained over this time period. The resultant stream had a purity of about 97 mass % without further processing. After a single water wash and a single air-drier, the purity of the stream was greater than 99.5 mass %.

The simultaneous separation of glycerol was checked by centrifuging samples leaving the top of the reactor. Well over 95 mass % of the liquid glycerol produced in the reaction settled to the bottom of the reactor for removal as a separate byproduct stream. In other words, less than 5 mass % of the liquid glycerol was removed with the biodiesel. This degree of glycerol removal from the biodiesel stream renders a glycerol separator unnecessary, as the small amount of residual glycerol in the biodiesel stream is further reduced by normal downstream operations. In other words, where other biodiesel forming processes require a special separator as well as a wash and dry step to remove the glycerol, the present process can attain substantially complete glycerol removal with only the wash and drying stages; i.e., with no special (separate) glycerol separation.

Based upon the above examples, it is clear that, using the present counter-current flow process where the reactants flow upward through the reactor and the glycerol settles downward, in a single commercial scale reactor, at least 99 mass % conversion of vegetable oil to biodiesel can be attained and at least 95 mass % of the glycerol can be removed as a separate byproduct stream in the single reactor.

The present process offers numerous advantages including: (i) improved economics (smaller size and simpler operation compared to batch processes, and lower energy consumption in the process compared to continuous processes; e.g., lower temperatures; (ii) facile scalability; (iii) continuous operation (e.g., of a laminar flow, unmixed reactor); (iv) continuous separation of byproduct stream by settling from a flowing stream of reactants; (v) continuous separation of excess reactant and catalyst by washing the flowing product stream; and/or (vi) continuous removal of residual water by countercurrent air bubbling. The reactants and products are and remain in the liquid form throughout the transesterification reactors. The laminar flow within these reactor(s) and flow rate allow the liquid glycerol to settle down through the reactor without the need for a distillation process.

In prior art continuous processes, the reactors require much higher energy input to generate productivity similar to that attained herein and often require additional units to separate glycerol. In some cases, these continuous processes heat a bottom stream to well over 250° F. (121.1° C.) to separate volatile biodiesel and methanol from glycerol (the reactive distillation processes). These processes must also remove heat at the top of the column to condense the biodiesel stream, and this refrigeration process also consumes lots of energy. In other cases, these continuous processes use various high energy separation devices such as continuous centrifuge to facilitate glycerol and biodiesel separation.

In art batch processes, the reactor size is typically much larger to accommodate holding the large batches of fluid for long periods of time necessary to complete the reaction. To achieve similar productivity as attained herein, the batch reactors are at least 100 times the volume of the transesterification reactor disclosed herein.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the reactor(s) includes one or more reactors). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments. As used herein, the terms sheet, film, plate, and layer, are used interchangeably, and are not intended to denote size.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to several embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for the production of alkyl esters, comprising:
    introducing liquid biomass and an alcohol to a first transesterification reactor at a point in a lower 25% of the reactor, wherein the liquid biomass and the alcohol form a combined liquid stream that flows upward through the first transesterification reactor in a laminar flow;
    reacting the liquid biomass and the alcohol to form a liquid glycerol and a liquid alkyl ester, wherein greater than or equal to about 75 mass % of the liquid glycerol moves towards a bottom of the first transesterification reactor;
    removing a liquid alkyl ester stream from the first transesterification reactor; and
    removing the liquid glycerol from the first transesterification reactor.

2. The method of claim 1, further comprising purifying the liquid alkyl ester stream by
    washing the liquid alkyl ester stream to form a washed alkyl ester stream, wherein the liquid alkyl ester stream is washed by introducing the liquid alkyl ester stream to near a bottom of a water wash vessel and introducing water to near a top of the water wash vessel; and
    drying the washed alkyl ester stream.

3. The method of claim 1, wherein the liquid alkyl ester is formed in only one transesterification reactor, wherein the amount of alcohol is less than or equal to about 10% greater than a stoichiometric amount for the conversion of the biomass to the liquid alkyl ester, and wherein the percent conversion of the biomass to the liquid alkyl ester is greater than or equal to about 95 mass %.

4. The method of claim 1, wherein the combined liquid stream flows upward through the first transesterification reactor at a sufficiently slow rate to enable the liquid glycerol move to the bottom of the first transesterification reactor.

5. The method of claim 1, wherein the laminar flow is defined by a Reynold's number of less than or equal to 2,100.

6. The method of claim 1, wherein the combined liquid stream further comprises a transesterification catalyst selected from the group consisting of metal alcoholoates, metal hydrides, metal carbonates, metal acetates, sodium alkoxide, sodium hydroxide, and potassium hydroxide.

7. The method of claim 1, wherein the alcohol is selected from the group consisting of methanol, ethanol, isopropanol, butanol, multivalent alcohol, and combinations comprising at least one of the foregoing alcohols.

8. The method of claim 1, wherein the liquid biomass is selected from the group consisting of fatty acids, triglycerides, natural oil comprising free fatty acids, natural fat comprising free fatty acid, and combinations comprising at least one of the foregoing biomass.

9. The method of claim 1, wherein the liquid biomass is selected from the group consisting of sunflower seed oil, soya bean oil, corn oil, cottonseed oil, almond oil, groundnut oil, palm oil, coconut oil, linseed oil, castor oil, rapeseed oil, industry tallow, abattoir waste, and combinations comprising at least one of the foregoing biomass.

10. The method of claim 1, wherein the liquid biomass source comprises used cooking oil.

11. The method of claim 1, further comprising combining the liquid biomass and the alcohol to form a combined liquid stream that is introduced to the first transesterification reactor.

12. A method for the production of alkyl esters, comprising:
    introducing an alcohol, liquid biomass, and a transesterification catalyst to a first transesterification reactor at a point in a lower 25% of the reactor, wherein the alcohol is selected from the group consisting of methanol, ethanol, isopropanol, butanol, multivalent alcohol, and combinations comprising at least one of the foregoing alcohols, wherein the liquid biomass is selected from the group consisting of fatty acids, triglycerides, natural oil comprising free fatty acids, natural fat comprising free fatty acid, and combinations comprising at least one of the foregoing biomass, and wherein the liquid biomass and the alcohol form a combined liquid stream that flows upward through the first transesterification reactor in a laminar flow;
    reacting the liquid biomass and the alcohol to form a liquid glycerol and a liquid alkyl ester, wherein greater than or equal to about 75 mass % of the liquid glycerol moves towards a bottom of the first transesterification reactor;
    removing a liquid alkyl ester stream from the first transesterification reactor; and
    removing the liquid glycerol from the first transesterification reactor.

13. The method of claim 12, wherein the laminar flow is defined by a Reynold's number of less than or equal to 2,100.

* * * * *